Patented Mar. 6, 1934

1,949,832

UNITED STATES PATENT OFFICE 1,949,832

RESINOUS COMPOSITION AND METHOD OF FORMING THE SAME

Arthur S. Ford, New York, N. Y., assignor to Industrial Sugar Products Corporation, New York, N. Y., a corporation of Delaware No Drawing. Application June 10, 1931, Serial No. 543,488

19 Claims. (Cl. 260—3)

This invention relates to a process for the formation of a novel resinous composition, and the composition of matter thereby formed.

According to the invention, the process is susceptible of numerous variations in the quantities and character of the ingredients involved, and these variations of the process produce products of differing characteristics which have various uses in the arts.

One of the objects of the present invention is to produce a plastic resin resulting from the condensation or reaction of phthalic anhydride with the reaction product of a saccharide such as sugar and an aldehyde such as formaldehyde or a substance capable of producing formaldehyde. The condensation or reaction product thus formed is capable of being poured into molds and rapidly setting therein as a hard brilliant plastic substance whose color varies with the degree and extent of the heating to which the solution of formation has been subjected, and which is insoluble in water but soluble in organic or spirit solvents, and may be used as a molding powder.

A further object of the invention is to produce, according to another form thereof, a baking lacquer or enamel of dark color, great strength and covering qualities, and completely impervious to water.

Other objects and advantages and uses of the invention will appear from the description thereof which is given below.

This application is a continuation in part of my pending application Serial No. 384,230, filed August 7, 1929, for "Synthetic resins".

In an application filed by me on even date herewith and identified as S. N. 543,484, I describe and claim a resinous or adhesive substance made by the condensation or reaction together of a saccharide such as sugar and an aldehyde such as formaldehyde in aqueous solution.

In an application filed by me on even date herewith and identified as S. N. 543,485, I disclose and claim a water-insoluble resinous substance made by the condensation or reaction together of an anhydrous saccharide such as sugar and an anhydrous aldehyde such as paraformaldehyde.

In two other applications filed by me on even date herewith and identified as S. N. 543,486 and S. N. 543,487, I disclose and claim a composition of matter made by the reaction of urea or organic acids with the reaction product of a saccharide and an aldehyde.

It is a feature of the present invention that a saccharide is first condensed or reacted with an aldehyde, and the resultant condensation product, either with or without the addition of a hardening agent, is condensed or reacted with phthalic anhydride. The final condensation product so obtained, according to the invention, may be nearly water-white, or a light golden yellow, or any darker shade to a jet black, depending upon the manner and extent of heating after the addition of phthalic anhydride.

A further feature of my invention resides in the method by which the second stage of the reaction, or second condensation, is carried out in order to avoid explosive destruction of the apparatus.

A further feature of my invention resides in the production of a varnish or baking lacquer by the solution of the product of the second stage of condensation, above referred to, in a suitable organic or spirit solvent, and the application of this solution to a surface to be lacquered or enameled, and if desired the baking thereof to drive off more completely the organic solvent and to drive still further toward completion the final stage of condensation to produce an enamel of great hardness and permanence, and substantially impervious to water.

In accordance with one form of the present invention a saccharide, or a substance containing a saccharide including particularly but not by way of limitation, cane sugar, invert sugar, glucose, saccharose, levulose, molasses (for the production of a dark brown or black resin or adhesive), or chopped sugar cane which has not been freed of sap (for the production preferably of opaque filled resinous masses) or other mono- or disaccharides, is caused to react with a reagent such as an aldehydic substance or a substance capable of producing an aldehyde, such as formalin, paraformaldehyde or oxymethylene, furfural, or formaldehyde gas, or with an aromatic amine, such as anilin oil. Any one of the saccharides mentioned may be used singly, or two or more of the same may be mixed. Any one of the reagents named above for reaction with the saccharides may be used singly, or two or more thereof may be mixed. The reaction takes place in the presence of a suitable solvent, the use of water being preferred in the practise of the invention.

In accordance with another form of the invention an anhydrous saccharide, such as refined cane sugar, anhydrous invert sugars, anhydrous glucose, or other mono- or disaccharides from which water of solution (as distinguished from water of crystallization or chemically constituent water) has been expelled, is heated slightly above the melting point thereof until it is brought to a fluid condition without substantial caramelization or charring, and in this fluid is then dissolved a suitable amount of an anhydrous aldehyde such as the crystalline polymer of formaldehyde, known as paraformaldehyde or oxymethylene, or formaldehyde gas is bubbled through the fluid. Any one of the saccharides mentioned may be used alone, or two or more may be combined. Any one or more of the aldehydes may be used alone, or two or more may be combined. The reaction between the anhydrous saccharide and the anhydrous aldehyde may be carried out under pressure in an autoclave so that air is prevented from coming into contact with the reacting mixture.

In the examples which are set forth below I have indicated exact quantities of materials which may be used in the successful carrying out of this invention, but these are illustrative only as the quantities involved may be varied within considerable limits to produce substances having different physical characteristics. I have found that a large amount of the aldehyde or equivalent substance in excess of the quantities stated in the examples is not harmful, as the excess appears to be driven off upon heating. On the other hand, an excess of the saccharide produces a resin which remains sticky and tacky on its outer surface and will not harden properly.

I do not know the nature of the reaction which takes place between the saccharide and the aldehyde, but it would appear that the sugar is fully consumed as the reaction mass which is produced does not have the ordinary physical characteristics of sugar, nor does it have most of the chemical characteristics thereof though it will rotate the plane of transmitted light.

Inasmuch as the reaction between the sugar and the aldehyde preferably occurs without caramelization of the sugar, the reaction will take place below 100° C. when dry sugar and a dry aldehyde are used, and will take place below caramelization temperature when water is present as in case of the use of formaldehyde gas dissolved in water. Accordingly, a reference herein to a substance capable of producing an aldehyde is intended as a reference to a substance which will yield an aldehyde at the reaction temperature, e. g., at temperatures in the neighborhood of 100° C. to 150° C.

Upon completion of the preliminary condensation or reaction between the saccharide and the aldehyde, there is then added to the resultant reaction mass in the vessel a suitable quantity of phthalic anhydride in a number of small quantities at intervals with constant stirring or agitation of the liquid between installments in order to insure the complete solution and absorption of each installment before the addition of a subsequent installment.

I have found that the addition of the entire amount of phthalic anhydride at one time will produce a reaction of explosive violence, but apparently no chemical detriment is produced if the apparatus is so designed and constructed as to be able to withstand the effect of the sudden generation of pressure. Accordingly, while no chemical detriment appeals to flow from the addition of the entire amount of phthalic anhydride at one time, convenience in manipulation makes it preferable to introduce the same in a number of small installments with constant stirring and agitation so that the violence of the reaction is dissipated.

The amount of phthalic anhydride employed may be varied within wide limits, depending upon the hardness, water-resistance and color of the product which it is desired to obtain. The quantity of phthalic anhydride may be varied from 50% to 150%, by weight, of the saccharide originally employed, and it is probable that the quantities can be varied within wider limits than those stated without obtaining a substantially different product or departing from the invention.

Heating is employed during the initial condensation reaction of the saccharide and the aldehyde. As the temperature of the heating vessel is raised there is a slow evolution of gas. When the temperature has been raised sufficiently to cause the condensation reaction to take place there is a sudden strong evolution of gas. Thereafter, though the temperature be substantially raised, there is no further substantial evolution of gas, though if the reaction be carried out in aqueous solution there will be a slow elimination of water vapor. After this initial condensation has taken place there is a noticeable change in the physical characteristics of the contents of the heating vessel, including especially the elimination of any tendency to caramelize on increase of temperature above the caramelizing point of sugar which is about 100° C.

After the first condensation reaction has been completed, the phthalic anhydride is then added. This is added in a succession of small installments in accordance with the foregoing description, and during the addition of the phthalic anhydride the liquid is maintained at a suitably elevated temperature to promote rapid absorption of the phthalic anhydride. This can be effectively accomplished at a temperature of about 180° C.

After the phthalic anhydride has been added, and if the initial reaction was carried out in aqueous solution, it is necessary to heat further to drive off water vapor. If this is carried out at relatively high temperatures, such as 200°–300° C., there will be bubbling and frothing and as the heat is continued the solution will gradually change from a clear and water-white appearance to a light amber or golden yellow, and then successively through darker shades until it will become, if kept long enough at these high temperatures, dark brown or jet black. In this way it is possible to produce a resinous substance which is dark brown or jet black in color, and which will produce a varnish or baking lacquer of the same color.

If it is desired to produce a plastic substance of light color, or substantially colorless, this can be accomplished by maintaining the temperature of the solution, after addition of phthalic anhydride, at a temperature slightly less than the boiling point of water, i. e., about 90° C. for a somewhat long period of time. In this way most of the water vapor can be expelled (if water vapor was originally present) without substantial discoloration of the solution.

Accordingly hardness and water-resisting qualities of the end product can be increased by increasing the percentage of phthalic anhydride employed. At the same time color can be controlled by temperature control, that is, heating the reaction mass after addition of the phthalic anhydride to a relatively high temperature will promote the generation of color within the reaction mass and omission of such heating (i. e., heating only to, say 90° C. to drive off water vapor if present) will preserve the substantially water-white characteristics of the reaction mass.

The addition of phthalic anhydride to the solution in which saccharide and the aldehyde have condensed, appears to give rise to a second stage of condensation or reaction. After the phthalic anhydride has been reacted or condensed with the substance already in the vessel, and if necessary after water vapor has been eliminated, the fluid is then ready to be poured into molds. It is a noticeable difference between the process of this invention and the process set forth in my applications S. N. 543,486 and S. N. 543,487, that cooling effects immediate hardening of the reaction mass in the present invention, whereas in the applications referred to, wherein urea and various organic acids are employed, increased viscosity and loss of pouring quality appear to be brought about by continuing the heating and cooling will preserve the ability of the mass to be poured till further heated.

Upon pouring into molds and cooling, the reaction mass of this invention sets rapidly into a hard brittle crystalline substance which breaks with a sharp brilliant fracture, is transparent (unless heating has been carried to an extent sufficient to raise a high coloration) and is insoluble in water though soluble in organic or spirit solvents.

The cooled and hardened reaction mass of this invention may be pulverized or broken up to form a useful molding powder. This molding powder has the useful characteristic that it will keep indefinitely in the open air and not lose its useful qualities. It has a variety of fields of usefulness either alone or as a binder to be incorporated with suitable inert fillers in the preparation of tough durable molded articles which may have a wide range of properties depending on the ingredients selected. Thus, opacity may be obtained by the use of inert fillers such as ground-up synthetic or natural resins or gums, waxes, fats, reclaimed rubber, cellulose nitrate or acetate, or the like, or synthetic condensation products. Transparency may be obtained by the use of powdered glass wool. Special effects may be obtained by the use of colored powdered glass wool, or combinations of powdered glass wool of differing colors. Dielectric strength may be obtained by the addition of any inert non-metallic substances, including those named above, which serve to give strength and rigidity to the mass.

This molding powder, being itself water-insoluble, gives the quality of water-resistance to all the molded articles of which it forms a substantial part. If desired, however, oils such as castor or linseed oils may be added to increase the water-resistance of the molded articles.

The molding powder above referred to, when mixed with the other substances mentioned, may be pressed into molds under a pressure of 1000 to 2000 pounds per square inch at a temperature of 150°–350° C. Thus a resin may be produced, which has high tensile strength, and is capable of being machined, turned and polished. The molded articles made with my molding powder herein disclosed appear to be very light and have a very low specific gravity.

The cooled and hardened reaction mass of this invention may be dissolved in a suitable organic or spirit solvent to form a satisfactory varnish or baking laquer. If the reaction was so controlled as to produce a nearly water-white product, it is possible by solution thereof in a spirit solvent to produce a water-white colorless varnish which has satisfactory covering properties and is water-insoluble. When painted or sprayed on a surface it may be baked thereon, if desired, to give a very hard water-impervious surface of high lustre. This baking, if prolonged, will cause the enamel or varnish to become gradually darker in color, ranging through various shades from light golden amber to deep brown or jet black.

The following illustrations are set forth by way of example only:—

Example 1.—300 gms. of granulated white sugar was dissolved in a vessel in 250 cc. of 36% commercial formalin solution. Heat was applied to the vessel and the contents were stirred until the sugar had dissolved. The temperature was then gradually raised taking care not to permit caramelization of the sugar until a temperature was reached at which there was a large evolution of gas and finally, without temperature reduction, the liquid became quiet. There was then added 10 gms. of hexamethylenetetramine, with sufficient stirring to get it into solution. Thereafter the heat was gradually raised to the neighborhood of 180° C. and there was then added to the solution in ten equal installments at intervals of about a minute with constant stirring and agitation, 300 gms. phthalic anhydride. Each installment was sprinkled gently on the surface of the fluid with constant stirring and agitation. The addition of phthalic anhydride produced substantial bubbling which continued for about a minute after the addition of each installment.

After all the phthalic anhydride had been gotten into solution, the temperature was reduced to 90° C. and maintained there for several hours. After the heating at this temperature, it was found that the water-white characteristic of the reaction mass in the vessel had not materially changed. The liquid was now poured into molds and permitted to cool. It was found, after cooling, to have set as a brilliant substantially water-white non-resilient substance which was somewhat brittle and broke with a sharp fracture. It was soluble in spirit solvents such as acetone, but insoluble in water.

Example 2.—The process of Example 1 was carried out to the point at which the phthalic anhydride had been gotten into solution.

The temperature was now increased from 180° C. to the neighborhood of 250° C. and maintained there for several hours. During this time the color of the solution steadily darkened and at the end of ten hours the liquid had assumed a dark brown or blackish color.

This was poured into molds and hardened on cooling to a shiny brownish-black substance which was insoluble in water but soluble in spirit solvents.

Example 3.—225 gms. of granulated cane sugar were placed in an autoclave and gradually heated with occasional agitation until the sugar had melted to a light amber fluid. Without diminishing the temperature there was then added 100 gms. of solid paraformaldehyde, and the contents of the autoclave were agitated until the solution was completed. The temperature was then gradually increased and the reaction between the sugar and the formaldehyde was permitted to proceed under self-generated pressure. When the temperature had reached about 200° C. the pressure was released and there was added 10 gms. of hexamethylenetetramine. The liquid was sufficiently agitated to get the hexamethylenetetramine into solution. There was then added 200 gms. of phthalic anhydride in ten installments or portions with constant agitation. The solution frothed and bubbled noticeably and its color, already amber yellow, deepened somewhat.

When the phthalic anhydride had been gotten into solution, the liquid was at once poured without further heating into molds where, on cooling, it was found to have hardened to a shiny brownish resinous substance which was brittle, broke with a brilliant fracture, was insoluble in water, but soluble in spirit solvents.

*Example 4.*—The poured substance made in accordance with Example 1, was, after cooling, broken up and dissolved in acetone. It was found to go into solution readily and the concentration was so adjusted as to produce a thick viscous paint-like solution. This, being substantially water-white, was found to be an excellent crystal varnish which was waterproof and had good covering properties.

*Example 5.*—The varnish made in accordance with Example 4 was sprayed on a metal surface and then baked thereon at 300° C. for several hours. It was found to have darkened in color to a deep brownish black, and was hard, elastic, and tough. It was found to be durable even in thin application and was impervious to water.

In accordance with the foregoing disclosure, I am able to make a composition of matter having among others the following properties:

The poured reaction mass made in accordance with my invention, after it has cooled and hardened, forms a brilliant, somewhat brittle plastic substance which, depending on temperature control, may be substantially colorless and water-white or may range from light amber to jet black. It breaks with a brilliant fracture and its composition on hardening appears to be uniform. It is soluble in the usual organic or spirit solvents such as ether, alcohol, toluol, amyl acetate and acetone, but is not soluble in or affected by water so far as I have been able to ascertain.

This mass, when pulverized, forms a satisfactory molding powder which will keep satisfactorily in the open air indefinitely, is inherently water-insoluble and, when made water-white and colorless, can be usefully employed with various inert fillers mentioned above in the making of many molded articles whose properties depend on the nature and proportions of the inert fillers selected. It is a noticeable characteristic of my molding powder that its specific gravity is very low, and it is possible in using it to make molded articles of very low specific gravity.

The hardened reaction mass, when dissolved in a spirit solvent, was found to make a satisfactory varnish or lacquer which flowed well, had good covering properties, dried quickly to a brilliant and water impervious surface, and could be made water-white or any shade from amber to jet black by suitable control of the heating conditions as above set forth. When a colorless, or lightly colored, varnish of this kind was baked it was found that the hardness was increased and the inherent coloration increased. Baking any of the varnishes made in accordance with my invention improves the permanence and water-imperviousness.

I claim:

1. The process of making a plastic substance which comprises reacting together the product of the reaction of a saccharide of the group consisting of mono- and di-saccharides and an aldehyde, and phthalic anhydride.

2. The process of making a plastic substance which comprises reacting together the product of the reaction of a sugar and an aldehyde, and phthalic anhydride.

3. The process of making a plastic substance which comprises reacting together the product of the reaction of a sugar and a substance capable of producing formaldehyde at the reaction temperature, and phthalic anhydride.

4. The process of making a plastic substance which comprises reacting together a sugar and a substance capable of producing formaldehyde at the reaction temperature, and after the reaction is complete adding to the liquid in a succession of small increments sufficient phthalic anhydride to cause the reaction mass to set to a hard plastic substance on cooling.

5. A plastic substance comprising the product of the reaction of phthalic anhydride with the product of the reaction of a saccharide of the group consisting of mono- and di-saccharides and an aldehyde.

6. A plastic substance comprising the product of the reaction of phthalic anhydride with the product of the reaction of a sugar and an aldehyde.

7. A plastic substance comprising the product of the reaction of phthalic anhydride with the product of the reaction of a sugar and a substance capable of producing formaldehyde at the reaction temperature.

8. A molding powder comprising the pulverized product set forth in claim 5.

9. A molding powder comprising the pulverized product set forth in claim 6.

10. A molding powder comprising the pulverized product set forth in claim 7.

11. The process of making a plastic substance which comprises reacting together the product of the reaction of a sugar and formaldehyde, and phthalic acid.

12. The process of making a plastic substance which comprises reacting together the product of the reaction of a sugar and an aldehyde, and phthalic acid.

13. The process of making a plastic substance which comprises reacting together the product of the reaction of a saccharide of the group consisting of mono- and disaccharides and an aldehyde, and phthalic acid.

14. The process of making a plastic substance which comprises reacting together the product of the reaction of a sugar and formaldehyde, and phthalic acid and heating the reaction mass sufficiently to cause it to harden.

15. The process of making a plastic substance which comprises reacting together the product of the reaction of a saccharide of the group consisting of mono- and di-saccharides and an aldehyde, and phthalic acid and heating the reaction mass sufficiently to cause it to harden.

16. A plastic substance formed by the reaction of phthalic acid with the reaction mass of a sugar and formaldehyde.

17. A plastic substance formed by the reaction of phthalic acid with the reaction mass of a sugar and an aldehyde.

18. A plastic substance formed by the reaction of phthalic acid with the reaction mass of a saccharide of the group consisting of mono- and disaccharides and an aldehyde.

19. A molding powder for use in forming plastic substances comprising the pulverized product of claim 18.

ARTHUR S. FORD.